(12) United States Patent  
Marmash

(10) Patent No.: US 6,678,784 B2
(45) Date of Patent: Jan. 13, 2004

(54) SYSTEM AND METHOD FOR ADDRESS BROADCAST SYNCHRONIZATION USING A PLURALITY OF SWITCHES

(75) Inventor: Naser H. Marmash, Ashland, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/405,876

(22) Filed: Apr. 2, 2003

(65) Prior Publication Data

US 2003/0191879 A1 Oct. 9, 2003

Related U.S. Application Data

(62) Division of application No. 09/374,639, filed on Aug. 16, 1999, now Pat. No. 6,567,885.

(51) Int. Cl.[7] .............................................. G06F 13/00
(52) U.S. Cl. ...................... 710/316; 710/240; 370/360
(58) Field of Search .............................. 710/107–125, 710/240–244, 36–51, 316–317; 370/360–365; 711/3, 118–146

(56) References Cited

U.S. PATENT DOCUMENTS 6,483,844 B1 * 11/2002 Erimli ........................ 370/428

2003/0043843 A1 * 3/2003 Smith et al. ................ 370/462

* cited by examiner

Primary Examiner—Sumati Lefkowitz
(74) Attorney, Agent, or Firm—Meyertons Hood Kivlin Kowert & Goetzel, P.C.; B. Noël Kivlin

(57) ABSTRACT

A system and method providing address broadcast synchronization using multiple switches. The system for concurrently providing addresses to a plurality of devices includes a first switch and a second switch. The first switch is coupled to receive address requests from a first plurality of sources. The first switch is configured to output the address request from the first plurality of sources. The second switch is coupled to receive address requests from a second plurality of sources. The second switch is configured to receive the address request from the first plurality of sources from the first switch. The second switch is further configured to delay the address request from the second plurality of sources prior to arbitrating between ones of the address request from the second plurality of sources and ones of the address request from the first party of sources received from the first switch. The second switch selects a selected address request, and the first and the second switch are further configured to broadcast concurrently a corresponding address to the selected address request. A method is also contemplated for concurrently providing addresses to a plurality of devices. A method of arbitrating in a first switch and a second switch between requests to the first switch and the second switch is disclosed where the arbitrated outcomes in both the first switch and the second switch are identical.

8 Claims, 4 Drawing Sheets

SYSTEM AND METHOD FOR ADDRESS BROADCAST SYNCHRONIZATION USING A PLURALITY OF SWITCHES

This is a division of application Ser. No. 09/374,639, filed Aug. 16, 1999, now U.S. Pat. No. 6,567,885.

BACKGROUND OF THE INVENTION

1. Field of the Invention

This invention relates to cache synchronization, and more particularly to address broadcast synchronization to a plurality of potentially responding devices.

2. Description of the Relevant Art

Maintaining cache coherency in an N-way system, where N is the number of processors in the system, is essential. In a system where N is small (N<4), the address buses of all cacheable devices may be physically connected together. Therefore, all cacheable devices may see a cache miss address simultaneously. On the other hand, when a system of N is large (N>4), it becomes electrically unfeasible to connect the address buses of all cacheable devices together.

One approach for achieving cache coherency in a system with large N, is by broadcasting the cache miss addresses to all cacheable devices simultaneously, through an address broadcast network. The address broadcast network has an address-in and an address-out connection to each of the cacheable devices. When a device sends a cache miss address to the address broadcast network, the address gets buffered, and then broadcast to all devices concurrently, so that all devices may check or update their tags appropriately.

One problem with building an address network in hardware for large systems (N>4) is that one needs a very large pin count ASIC (Application Specific Integrated Circuit) to accommodate all address-ins and address-outs for all cacheable devices to maintain address synchronization. The expense of building a large pin count ASIC to accommodate all address-ins and all address-outs for all cacheable devices limits this solution to only a very small number of computer systems.

Another possible solution is to slice the address network into X (X>1) slices for a small ASIC solution. The problem with address slicing is that using typical request and grant flow control techniques between address slices to maintain address synchronization requires a computer system performance degradation that is unacceptable.

What is needed is a mechanism for achieving synchronization between address network slices without substantial performance degradation. The request and grant flow control technique used should require a minimum number of control signals passing between each switch.

SUMMARY OF THE INVENTION

The problems outlined above are in large part solved by a system and method providing address broadcast synchronization using multiple switches. Each switch may be an application specific integration circuit (ASIC) or a separate switching device. By dividing address requests between more than one switch, addresses may be broadcast concurrently to a plurality of devices, which may advantageously provide for a higher system performance at a lower cost.

In one embodiment, the system for concurrently providing addresses to a plurality of devices includes a first switch and a second switch. The first switch is coupled to receive address requests from a first plurality of sources. The first switch is configured to output the address request from the first plurality of sources. The second switch is coupled to receive address requests from a second plurality of sources. The second switch is configured to receive the address request from the first plurality of sources from the first switch. The second switch is further configured to delay the address request from the second plurality of sources prior to arbitrating between ones of the address request from the second plurality of sources and ones of the address request from the first party of sources received from the first switch. The second switch selects a selected address request, and the first and the second switch are further configured to broadcast concurrently a corresponding address to the selected address request.

A method is also contemplated, in one embodiment, for concurrently providing addresses to a plurality of devices. In one embodiment, the method comprises receiving at a first switch a first address and a corresponding first request from a first device. The method receives at a second switch a second address and a corresponding second request from a second device, with the first switch being different from the second switch. The method transfers the second address and the corresponding second request to the first switch. The method delays the corresponding first request in the first switch. The method arbitrates in the first switch between the corresponding first request and the corresponding second request but rather the first address or the second address will comprise a first transmission. The method concurrently broadcasts to a plurality of devices the first transmission from the first switch and the first transmission from the second switch where the first transmission from the first switch and the first transmission from the second switch are identical.

In another embodiment, a system for concurrently providing addresses to a plurality of devices includes a first switch and a second switch. The first switch is coupled to receive address requests from a first plurality of sources. The first switch is configured to output the address request from the first plurality of sources. The second switch is coupled to receive address requests from a second plurality of sources. The second switch comprises a broadcast buffer, an incoming buffer, a delay circuit, and a broadcast arbiter. The broadcast buffer is coupled to receive addresses of the address requests from the second plurality of sources. The incoming buffer is coupled to receive addresses of the output of the address requests from the first plurality of sources from the first switch. The delay circuit is coupled to receive the address requests from the second plurality of sources. The delay circuit is configured to delay the address requests from the second plurality of sources for a predetermined length of time. The broadcast arbiter is coupled to arbitrate between ones of the address request from the second plurality of sources and ones of the output of the address request from the first plurality of sources from the first switch for a selected address request. The first switch and the second switch are further configured to broadcast concurrently a corresponding address to the selected address request selected in the broadcast arbiter.

In still another embodiment, a method of arbitrating in a first switch and a second switch between requests to the first switch and the second switch is disclosed. The method comprises tracking which switch was most recently selected and tracking which switch is next to be selected. In response to a reset, the method selects the first switch and indicates that the second switch is next to be selected. In response to only a local request to the first switch or only a remote request to the second switch, the method selects the first switch and indicates that the first switch is next to be selected. In response to only a local request to the second switch or only a remote request to the first switch, the method selects the second switch and indicates that the second switch is next to be selected. In response to both a local request and a remote request concurrently, the method selects the switch which was not most recently selected, and the method indicates that the switch not most recently selected will be the next to be selected. Otherwise, the method selects the first switch and indicates the switch most recently selected as the next to be selected.

BRIEF DESCRIPTION OF THE DRAWINGS

Other objects and advantages of the invention will become apparent upon reading the following detailed description and upon reference to the accompanying drawings in which.

Figure 1:
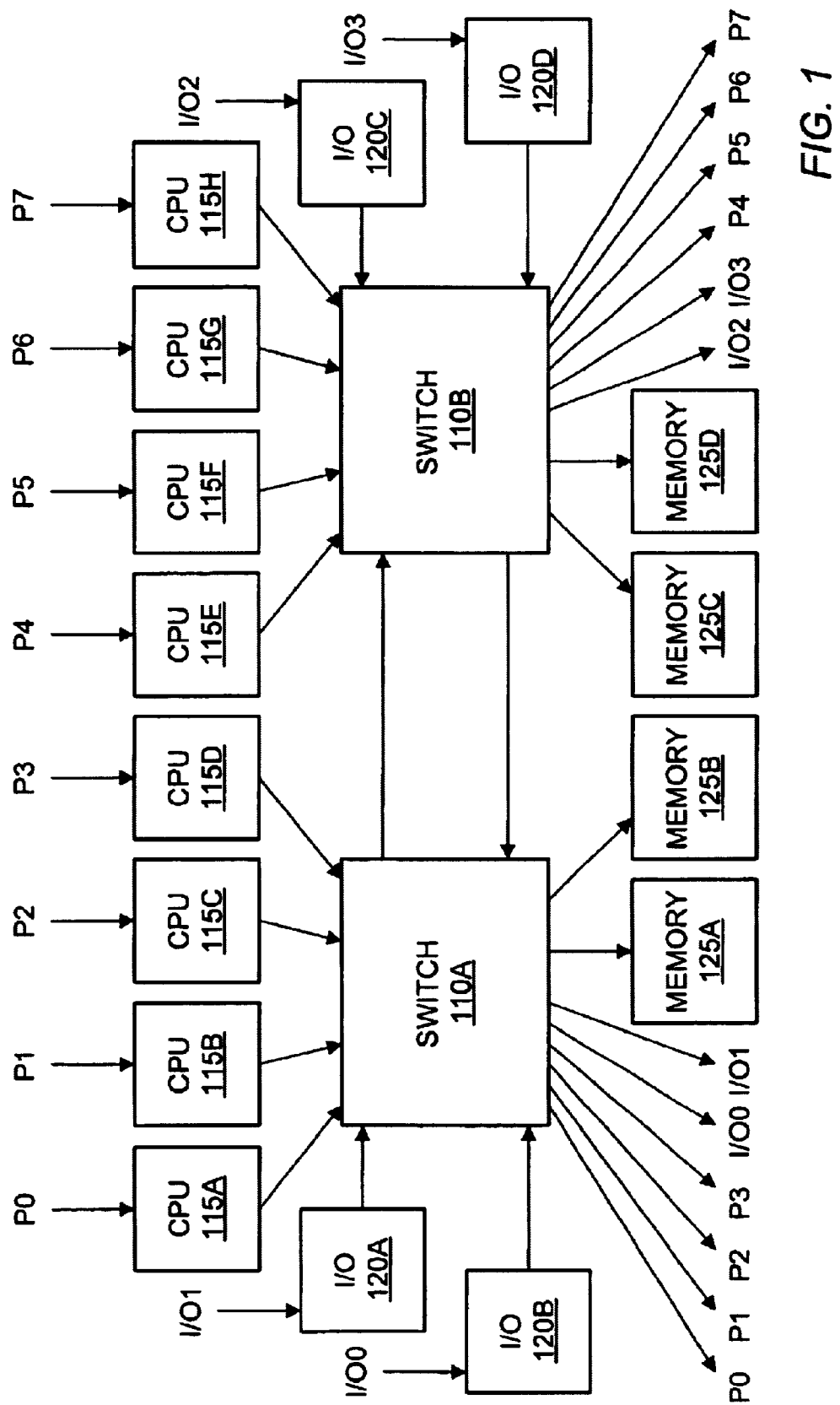
FIG. 1 is a block diagram of an embodiment of a computer system including two switches that concurrently provide addresses to a plurality of devices.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Similar features are designed herein using identical reference numerals. It is noted that the use of a reference numeral with an additional letter may designate a particular one of a group that may referenced as a while with the reference numeral by itself.

FIG. 1—Computer System Including Two Switches

FIG. 1 is a block diagram of a computer system including two switches, switch 110A and switch 110B. As shown, the computer system includes CPUs 115A–115H, input and output devices (I/O) 120A–120D, and memories 125A–125D. Data signals beginning with a P have a processor 115 as a destination, and data signals beginning with an I/O have an I/O device 120 as a destination. Switches 110A and 110B are shown receiving input from various groupings of the processors 115 and the I/O devices 120. The switches 110A and 110B are also shown outputting signals to various ones of the processors 115, the I/O devices 120, and to the memories 125.

A plurality of processors (CPUs) 115A–115H (eight as shown), each receives an input, preferably addresses, appropriately referenced as P0–P7. Each of the processors 115A–115H outputs an output, preferably an address and an address request, such as an address request packet, to one of the two switches 110A and 110B. As shown, switch 110A also accepts address request packets from I/O device 120A and I/O device 120B. Also as shown, switch 110B accepts address request packets from I/O device 120C and I/O device 120D. Switch 110A outputs an output signal, preferably address signals, to the CPUs 115A–115D, the I/O devices I/O0–I/O1, and memories 125A–125B. Switch 110B outputs an output signal, preferably address signals, to processors 115E–115H, I/O devices I/O2–I/O3, and memories 125C–125D. Switch 110A and switch 110B also exchange data, preferably including addresses and address requests.

It is noted that while a particular number of processors 115, I/O devices 120, and memories 125 are illustrated, any number of processors, I/O devices, and/or memories, or other devices are contemplated. It is also noted that while unidirectional data paths are illustrated, bi-directional data paths may also be used as desired.

Figure 2:
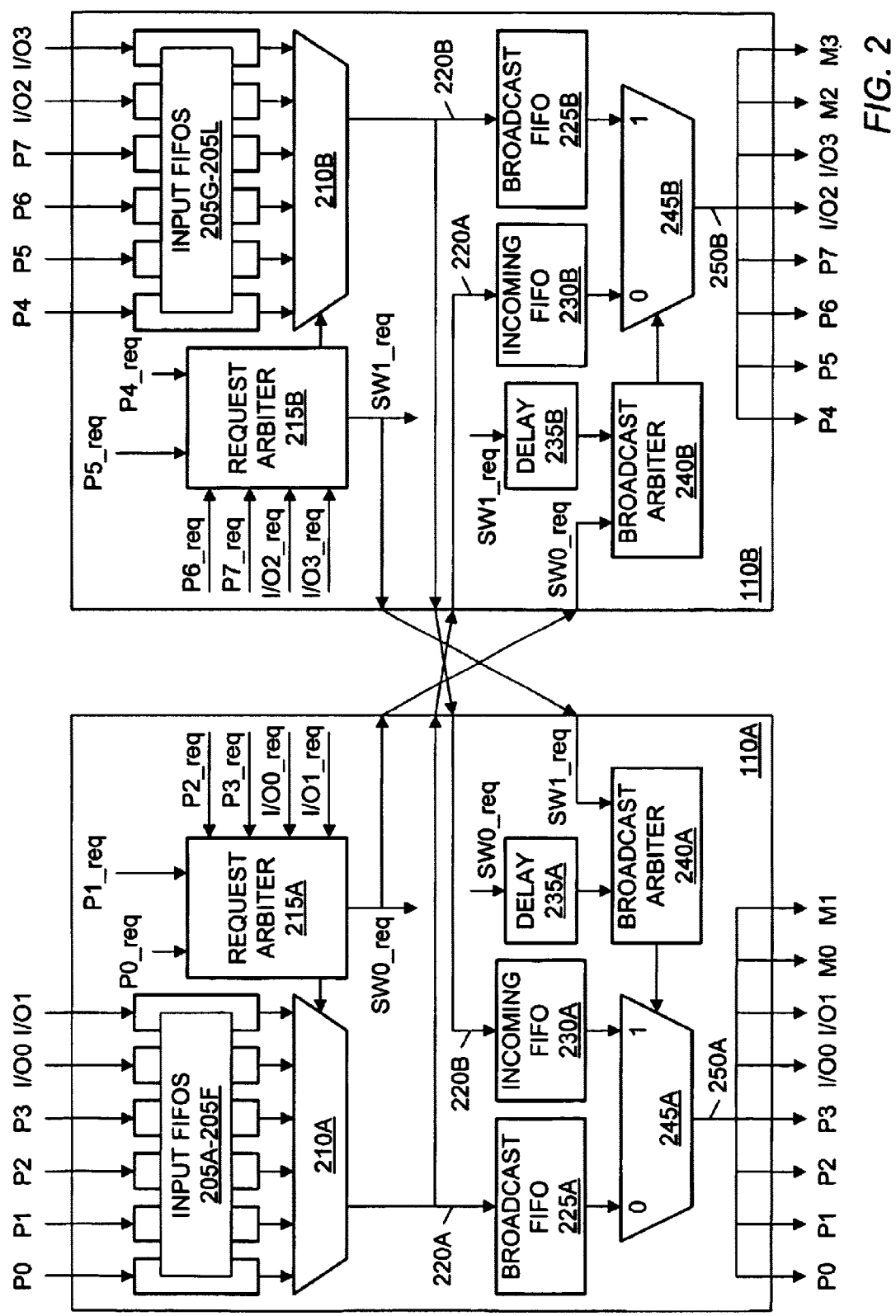
FIG. 2 is a block diagram of an embodiment of the two switches shown in FIG. 1.

FIG. 2—Address Broadcast Synchronization Switches

FIG. 2 is a block diagram of one embodiment of the switches 110A and 110B. As shown, each switch 110 includes a plurality of input FIFOs (First-In, First Out buffers) 205, a request arbiter 215, an input multiplexer (MUX) 210, a broadcast FIFO 225, an incoming FIFO 230, a delay circuit 235, a broadcast arbiter 240, and an output MUX 245. The switches 110 exchange output requests from their respective request arbiters 215 and output addresses from their respective input MUXes 210.

As illustrated, switch 110A accepts addresses P0–P3 and I/O0–I/O1, as well as address requests P0_req–P3_req and I/O0_req and I/O1_req. Switch 110A outputs address signals P0–P3, I/O0–I/O1, and M0–M1. Each incoming address P0–P3 and I/O0–I/O1 is received into an input FIFO 205A–205F. The address requests that correspond to the addresses received in the input FIFOs 205A–205F are received at a request arbiter 215A. In the preferred embodiment, the request arbiter 215A is a round-robin arbiter, although any other means of arbitration may be used as desired for choosing requests received by request arbiter 215A. When the request arbiter 215A chooses (or arbitrates) for a particular address request, the request arbiter 215A controls the selection at input MUX 210A with regard to the output of the input FIFOs 205A–205F. The selected address request is output as SW0_req to delay circuit 235A. The output of input MUX 210A, shown as signal 220A, is provided to a broadcast FIFO 225A. It is noted that output signal 220A is also provided to switch 110B, and that the address request SW0_req is also provided to switch 110B.

Switch 110A is also coupled to receive the address request SW1_req from switch 110B, as well as address output signal 220B. Signal 220B is received at incoming FIFO 230A. As shown, broadcast FIFO 225A and incoming FIFO 230A each output data to output MUX 245A, broadcast FIFO 225A as '0' (zero) and incoming FIFO 230A as '1' (one). Address request SW0_req is delayed for a period of time in delay circuit 235A before being provided to broadcast arbiter 240A. The period of time of the delay may be a predetermined period of time. It is noted that in a preferred embodiment, the predetermined period of time is equal to the time required for switch 110A to receive the address request SW1_req and the address output signal 220B. Broadcast arbiter 240A chooses (or arbitrates) between request SW0_req and request SW1_req. The broadcast arbiter 240A controls the output of output MUX 245A choosing between '0' and '1'. The output of output MUX 245A, the selected address for the first transmission, is provided concurrently to various groups of the processors 115, I/O devices 120, and/or memories 125 through signals P0–P3, I/O0–I/O1, and M0–M1.

As illustrated, switch 110B accepts addresses P4–P7 and I/O2–I/O3, as well as address requests P4_req–P7_req and I/O2_req and I/O3_req. Switch 110B outputs address signals P4–P7, I/O2–I/O3, and M2–M3. Each incoming address P4–P7 and I/O2–I/O3 is received into an input FIFO 205G–205L. The address requests that correspond to the addresses received in the input FIFOs 205G–205L are received at a request arbiter 215B. In the preferred embodiment, the request arbiter 215B is a round-robin arbiter, although any other means of arbitration may be used as desired for choosing requests received by request arbiter 215B. When the request arbiter 215B chooses (or arbitrates) for a particular address request, the request arbiter 215B controls the selection at input MUX 210B with regard to the output of the input FIFOs 205G–205L. The selected address request is output as SW1_req to delay circuit 235B. The output of input MUX 210B, shown as signal 220B, is provided to a broadcast FIFO 225B. It is noted that output signal 220B is also provided to switch 110A, and that the address request SW1_req is also provided to switch 110A.

Switch 110B is also coupled to receive the address request SW0_req from switch 110A, as well as address output signal 220A. Signal 220A is received at incoming FIFO 230B. As shown, broadcast FIFO 225B and incoming FIFO 230B each output data to output MUX 245B, broadcast FIFO 225B as '1' (one) and incoming FIFO 230B as '0' (zero). Address request SW1_req is delayed for a period of time in delay circuit 235B before being provided to broadcast arbiter 240B. The period of time of the delay may be a predetermined period of time. It is noted that in a preferred embodiment, the predetermined period of time is equal to the time required for switch 110B to receive the address request SW0_req and the address output signal 220A. Broadcast arbiter 240B chooses (or arbitrates) between request SW0_req and request SW1_req. The broadcast arbiter 240B controls the output of output MUX 245B choosing between '0' and '1'. The output of output MUX 245B, the selected address for the first transmission, is provided concurrently to various groups of the processors 115, I/O devices 120, and/or memories 125 through signals P4–P7, I/O2–I/O3, and M2–M3.

It is noted that the delay circuits 235A and 235B may include any circuit that is configured to delay the output of a received signal. In one embodiment, a delay circuit 235 delays the received signal longer than the minimum time required to propagate the received signal through delay circuit 235. In another embodiment, delay circuit 235 includes one or more flip-flops. It is also noted that in various embodiments various incoming and outgoing signals to and from switches 110A and 110B may be buffered at input to the switch 110 and/or on output from the switch 110.

Generally speaking, the system of FIG. 1 operates as described herein. The first switch 110A is coupled to receive address requests from a first plurality of sources. For example, one plurality of sources may be processors 115A–115D and/or I/O devices 120A–120B. The first switch 110A is configured to output a received address request from the first plurality of sources.

The second switch 110B is coupled to receive address requests from a second plurality of sources. For example, the second plurality of sources may include processors 115E–115H and/or I/O devices 120C–120D. Switch 110B is also configured to receive the address request from the first plurality of sources from the first switch 110A. The second switch is further configured to delay internally address requests from the second plurality of sources. It is noted that the length of the delay may be predetermined, and is preferably equal in length of time to the time delay in receiving the address request from the first plurality of sources from the first switch. The second switch 110B is further configured to arbitrate between ones of the address requests from the second plurality of sources and ones of the address request from the first plurality of sources output from the first switch. The arbitration between the address requests is to determine a selected address request. Once a selected address request has been selected, the first switch and the second switch are further configured to broadcast concurrently the corresponding address to the selected address request. It is noted that the corresponding address will broadcast to any or all devices, including the CPUs 115A–115H, I/O devices 120A–120B, and memories 125A–125D.

In one embodiment, the second switch 110B is further configured to output the address request from the second plurality of sources, and the first switch 110A is further configured to receive this request from the second plurality of sources. First switch 110A is further configured to delay internally the address request from the first plurality of sources. The time of the delay of the address request from the first plurality of sources may be a predetermined length of time and is preferably a length of time approximately equal to the time required for the second switch 110B to provide the address request in the second plurality of sources to first switch 110A. The first switch is further configured to arbitrate between ones of the address request from the first plurality of sources and ones of the address requests from the second plurality of sources from the second switch. The arbitration is to determine the selected address request, as noted above for the second switch 110B. It is noted that the selected address provided by the first switch 110A and the selected address provided by the second switch 110B are the same and are concurrently provided to the devices as described above.

Figure 3A:
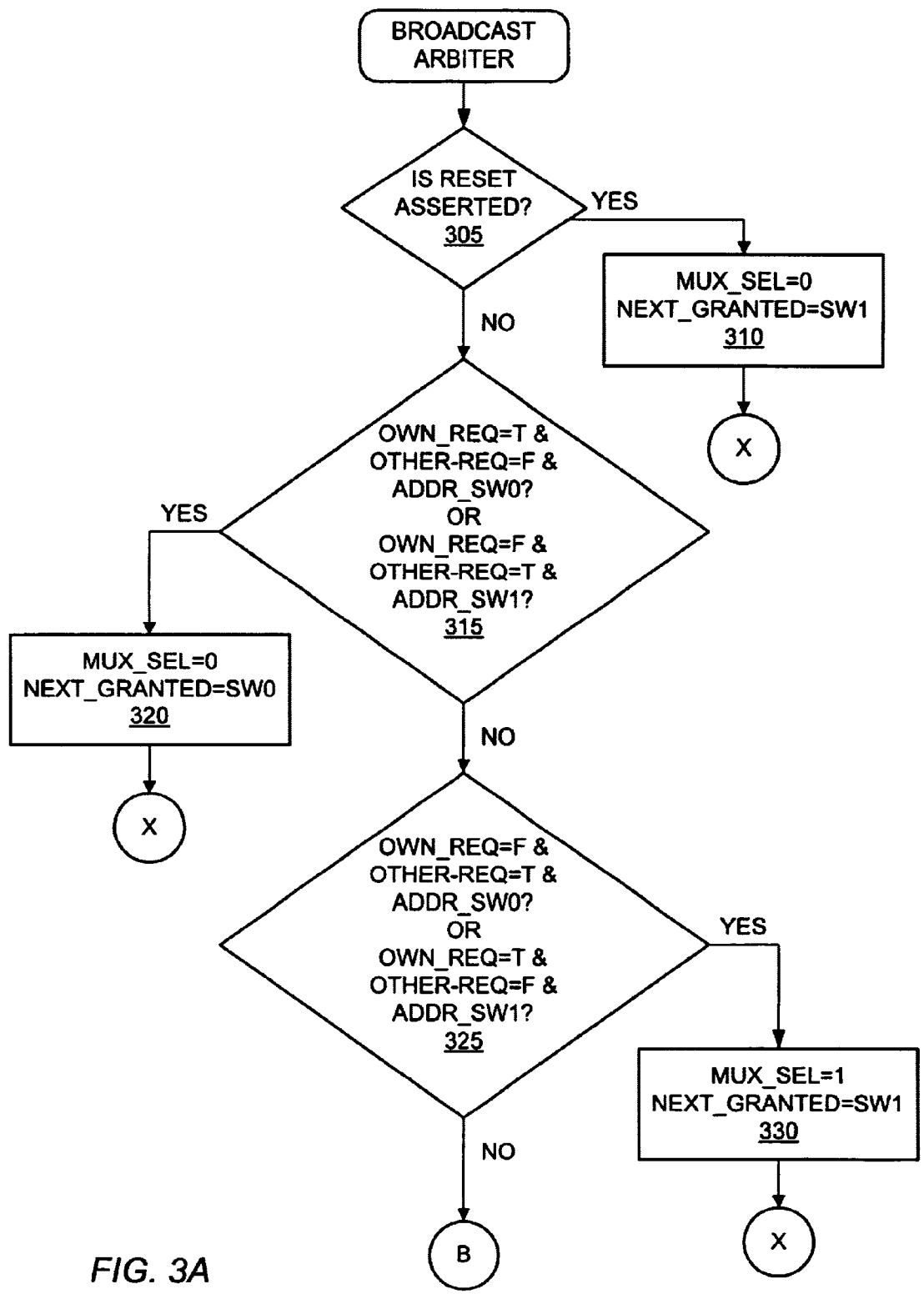
FIGS. 3A and 3B are a flowchart of an embodiment of a method for arbitrating in a first switch and a second switch between request to the first switch and the second switch.
Figure 3B:
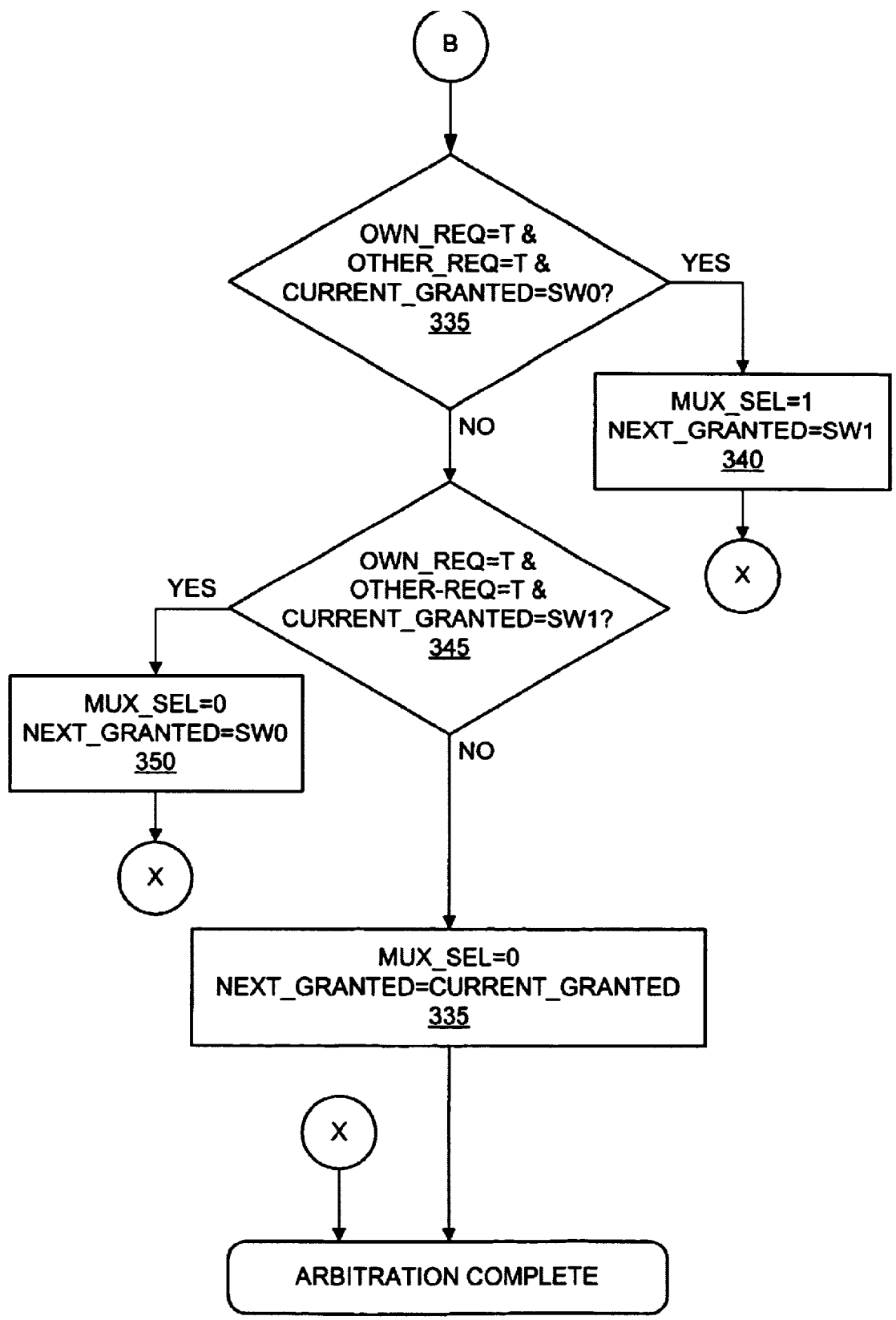

FIG. 3A–3B—Arbitration by a Broadcast Arbiter

FIGS. 3A and 3B illustrate a flowchart of an embodiment of a method for operating an arbiter, such as broadcast arbiters 240A and 240B. The method tracks which switch was most recently selected, and the method also tracks which switch is next to be selected. At decision block 305, the method checks to see if reset has been asserted. If reset has been asserted in decision box 305, then an output MUX selects output '0' (i.e. switch 110A) and the next granted switch will be the other switch (i.e. switch 110B) (step 310).

If reset has not been asserted in decision block 305, then the method determines if only a local request has been made to the first switch 110A or only a remote request has been made to the second switch 110B in decision block 315. If only a local request has been made to the first switch 110A or only a remote request is made to the second switch 110B, then the method selects output MUX output '0' and the next granted switch will be the same switch (step 320).

If there has not been only a local request to the first switch 110A or only a remote request to the second switch 110B, then the method moves to decision block 325. If only a local request has been made to the second switch 110B or only a remote request has been made to the first switch 110A in decision box 325, then the method selects output MUX output '1' and the next granted switch will be the same switch (step 330).

If only a local request to the second switch 110B or only a local request to the first switch 110A has not been made in decision block 325, then the method moves to decision block 335. In decision block 335, if both a local request and a remote request have concurrently been made, and the current granted switch is switch 110A, then the output MUX selects '1' and the next granted switch is switch 110A (step 340). If in decision block 335 both the local request and remote request have been made concurrently but the current granted switch is not switch 0, then the method moves to decision block 345.

In decision block 345, if both the local request and a remote request have been made concurrently and the current granted switch is switch 110B, then the output MUX selects '0' and the next granted switch is switch 110A (step 350). It is noted that in decision blocks 335 and 345, an affirmative decision is made in either case when a local request and a remote request have both been made concurrently. In either case the selected output MUX output is to the switch not most recently selected and the indicated switch as the next granted switch is also the switch not most recently selected.

The default action when all decision blocks are negative, is for the outgoing MUX to select '0', and the next granted switch is the current granted switch (step 355).

In various embodiments, the switches 110A and 110B may be application specific integrated circuits ASIC0 and ASIC1. In one embodiment, ASIC0 and ASIC1 are location strapped via jumpers. It is noted that ASIC0 preferably will have a pull-up resistor, while ASIC1 preferably has a pull-down resistor, both of which get latched on reset to identify which is ASIC0 and which is ASIC1. Note that the priority toggles between the broadcast arbiters based on the switch that had the last request granted and the current outstanding request. The method disclosed may advantageously ensure that both arbiters are synchronized to each other without a need for request/grant flow control mechanisms beyond the address and the corresponding address request that was initially received.

As an example of an embodiment of the operations of switches 110A and 110B, right after a reset, both processors 115A and 115E have an outstanding address packet in the address network. The P0 address packet is received in switch 110A's input FIFO 205A from processor 115A, whereas the P4 address packet is received and stored in switch 110B's input FIFO 205G from processor 115E. The request arbiter 215A in switch 110A will receive the P0 request associated with the address stored in input FIFO 205A. Similarly, request arbiter 215B receives the P4_req address request associated with the P4 address stored in input FIFO 205G.

Request arbiter 215A in switch 110A controls input MUX 210A to output the address associated with input signal P0 as output signal 220A, which is provided to broadcast FIFO 225A and to incoming FIFO 230B. Likewise, request arbiter 215B controls input MUX 210B to output the address from P4 as output signal 220B. Output signal 220B is provided to broadcast FIFO 225B and also to incoming FIFO 230A. Concurrently with the addresses being routed from the input FIFO 205 to the broadcast FIFOs 225 and incoming FIFOs 230, switch 110A has asserted SW0_req line indicating the presence of an address from switch 110A in broadcast FIFO 225A and incoming FIFO 230B.

As a finite amount of time is required for the address and the request line to be provided from one switch 110 to the other switch 110, in this case from switch 110A to switch 110B, signal SW0_req is first provided to a delay circuit 235A, before being provided to broadcast arbiter 240A. In the preferred embodiment, the delay circuit 235A delays the address request SW0_req by approximately an equal amount of time as required for switch 110A to receive the address and corresponding address request from switch 110B. In this embodiment, broadcast arbiter 240A receives notice that an address is present in the broadcast FIFO 225A concurrently with an address being available in the incoming FIFO 230A. The broadcast arbiter 240A chooses (or arbitrates) for priority between the SW0_req and SW1_req. The preferred arbitration method is described above with respect to FIGS. 3A and 3B. Broadcast arbiter 240A selects either '0' or '1' denoting the address from switch 110A or switch 110B, respectively, in controlling the output of the output multiplexer 245A.

It is noted that since SW0_req and SW1_req are both required to cross from one switch to the other, the signals endure a delay, such as two clock cycles in one embodiment. Therefore, each switch 110A and 110B delays the address request that it sends, SW0_req and SW1_req, respectively, to the broadcast arbiter 240 of the other switch by an equivalent time period of 2 clock cycles. This delay ensures that the broadcast arbiters 240A and 240B in each switch 110A and 110B receive the address request concurrently.

Switch 110A has the P0 address placed in its broadcast FIFO 225A and the P4 address placed in incoming FIFO 230A. Switch 110B has the P0 address placed in its incoming FIFO 230B and P4 packet placed in broadcast FIFO 225B. At this time broadcast arbiter 240A has received address request SW0_req and address request SW1_req, whereas broadcast arbiter 240B has likewise received address request SW0_req and address request SW1_req.

The arbitration method described above with respect to FIGS. 3A and 3B illustrates a preferred embodiment of how the broadcast arbiter 245 works for each address request that it receives. After a reset, the last granted switch defaults to switch 110A, so that switch 110A broadcast arbiter now has the highest priority. When the broadcast arbiter 240A has highest priority, then both broadcast arbiter 240A and broadcast arbiter 240B will select the '0' of the multiplexer 245B. It is noted that both broadcast arbiter 240A and broadcast arbiter 240B are at decision block 345 of FIG. 3B. Both a local request and a remote request have been received and the current granted switch is switch 110B (the default upon a reset), therefore the output MUXes 245A and 245B both select '0' and the next granted which will be switch 110A (step 350). Thus, the address from P0 is provided as output 250A and output 250B, concurrently on address lines P0–P7, I/O0–I/O3, and M0–M3.

Continuing, at decision block 325, as the request is now only the request from switch 1110B, the output MUXes 245 will select '1' and the next granted will be switch 110B (step 330). It is noted that broadcast arbiter 240A and broadcast arbiter 240B, following an arbitration method similar to that disclosed in FIGS. 3A and 3B, make selections between local and remote requests which are identical in all cases. It is also noted the broadcaster arbiter 240A knows that upon a reset that it will have priority just as broadcast arbiter 240B knows that after a reset it will not have priority.

Numerous variations and modifications will become apparent to those skilled in the art once the above disclosure is fully appreciated. It is intended that the following claims be interpreted to embrace all such variations and modifications.

What is claimed is:

1. A method of arbitrating in a first switch and a second switch between requests to said fist switch and said second switch, the method comprising:

tracking which switch was most recently selected;

tracking which switch is next to be selected;
in response to a reset,
   selecting the first switch; and
   indicating the second switch as next to be selected;
in response to only a local request to said first switch or only a remote request to said second switch,
   selecting the first switch; and
   indicating the first switch as next to be selected;
in response to only a local request to said second switch or only a remote request to said first switch,
   selecting the second switch; and
   indicating the second switch as next to be selected;
in response to both a local request and a remote request concurrently,
   selecting a switch not most recently selected; and
   indicating the switch not most recently selected as next to be selected;
otherwise,
   selecting the first switch; and
   indicating the switch most recently selected as next to be selected.

2. The method of claim 1, further comprising:
indicating the switch next to be selected as the switch most recently selected upon a rising edge of a clock.

3. A method of arbitration between requests received by a first arbitration unit and a second arbitration unit, said method comprising:
each of said first and said second arbitration units selecting for output a same one of said first and said second requests dependent upon which of said first and said second requests has been received at said first and said second arbitration units;
wherein each of said first and said second arbitration units:
   determining which of a fist request received by said first arbitration unit and a second request received by said second arbitration unit was most recently selected;
   selecting said first request in response to only receiving said first request and indicating that said first request is next to be selected;
   selecting said second request in response to only receiving said second request and indicating that said second request is next to be selected;
   selecting which of said first request and said second request that was not most recently selected in response to receiving both of said first request and said second request concurrently and indicating that said not most recently selected request is next to be selected.

4. The method of claim 3 further comprising each of said first and said second arbitration units selecting said first request and indicating that said second request is next to be selected in response to a reset.

5. The method of claim 3 further comprising each of said first and said second arbitration units selecting a next request received by said first switch and indicating that the request most recently selected is next to be selected in response to receiving neither of said first and said second requests.

6. A system comprising:
a first switch configured to receive a first request, wherein said first switch includes a first arbitration unit; and
a second switch configured to receive a second request wherein said second switch includes a second arbitration unit;
wherein said first switch and said second switch are coupled together, wherein said first request is routed to said second arbitration unit and said second request is routed to said first arbitration unit;
wherein each of said first and said second arbitration units is configured to:
   select said first request and to indicate that said second request is next to be selected in response to a reset;
   select said first request in response to only receiving said first request and to indicate that said first request is next to be selected;
   select said second request in response to only receiving said second request and to indicate that said second request is next to be selected;
   determine which of said first request and said second request was most recently selected; and
   select which of said first request and said second request that was not most recently selected in response to receiving both of said first request and said second request concurrently and to indicate that said not most recently selected request is next to be selected.

7. The system of claim 6, wherein each of said first and said second arbitration units is further configured to indicate the request next to be selected as the request most recently selected upon a rising edge of a clock.

8. The system of claim 6, wherein each of said first and said second arbitration units is further configured to select a next request received by said first switch and to indicate that the request most recently selected is next to be selected in response to receiving neither of said first and said second requests.

* * * * *